United States Patent Office 3,849,538
Patented Nov. 19, 1974

3,849,538
CATALYTIC PROCESS
John Stewart Campbell and Phineas Davies, Stockton-on-Tees, England, assignors to Imperial Chemical Industries Limited, London, England
No Drawing. Filed Oct. 13, 1971, Ser. No. 188,772
Claims priority, application Great Britain, Oct. 14, 1970, 48,825/70; Feb. 26, 1971, 5,546/71
Int. Cl. B01d 53/00
U.S. Cl. 423—213.5       4 Claims

ABSTRACT OF THE DISCLOSURE

An internal combustion engine exhaust gas is treated, in order to decrease its content of nitrogen oxides, over a refractory catalyst such as a high temperature steam reforming catalyst, under net reducing conditions at over 500° C., the conditions of temperature, catalytic activity and space velocity being chosen so as to destroy nitrogen oxides without substantial formation of ammonia. After this treatment, the gas is treated to remove carbon monoxide by for example catalytic oxidation. In starting the treatment the refractory catalyst can be warmed quickly to its operating temperature by initial use under oxidising conditions.

---

This invention relates to a catalytic process and apparatus for the conversion of the constituents of internal combustion engine exhaust gases to decrease the concentration of toxic compounds.

Internal combustion engine exhaust gases commonly contain carbon monoxide and nitric oxide and unburnt hydrocarbons, which are toxic or smog-forming, in addition to steam and carbon dioxide. It has been recognised for many years that it would be very desirable to convert these toxic or smog-forming compounds by the action of a catalyst but, for various reasons, this has not so far been practicable, owing to the contradictory requirements of the catalyst to be used. Thus a catalyst that effects oxidation of carbon monoxide and unburnt hydrocarbon generally tends to leave unaffected the nitric oxide produced in the engine. A catalyst that effects reduction of nitric oxide tends to produce ammonia, which is objectionable on account of its odour; any attempt to oxidise the ammonia by a subsequent catalytic stage is difficult to operate without producing nitric oxide once more. The difficulties of prior processes have produced various proposals involving air-addition to the exhaust gases and also modification of the engine with, for example, recycle of exhaust gases to the engine inlet so as substantially to dilute the mixture undergoing combustion. Over and above these difficulties, it is necessary to provide catalysts that maintain adequate activity and mechanical strength for very long periods.

With the increasing number of automobiles it has become necessary to set upper limits legislatively for the rates at which hydrocarbons, carbon monoxide and nitrogen oxides may be emitted. In U.S.A., Part 1201 of Chapter XII, Title 45, of the Code of Federal Regulations prescribes that by 1975 the upper limits shall be, in grams per vehicle mile:

Hydrocarbons ------------------------------ 0.41
Carbon monoxide --------------------------- 3.4
Oxides of nitrogen ------------------------ 3.0

From 1976 the limit for oxides of nitrogen is to be 0.40. These limits apply to a cycle of operation simulating an average trip in an urban area of 7.5 miles from a cold start, followed by the beginning of a second trip which is similar except that it is started 10 minutes after the first and thus has a "hot" start.

It is the general belief in the automobile industry that these limits cannot readily be reached. Thus in The Times for June 30, 1971 it was reported that motor manufacturers met the final U.S. federal regulations for the control of exhaust emissions with some dismay; a spokesman for the Ford Motor Company said: "We might just manage those governing hydrocarbons and carbon monoxide, but those for oxides of nitrogen look near impossible;" and Mr. William Ruckelshaus, administrator of the Environmental Protection Agency, a body set up by the U.S. Government, admitted that the limits were stringent and would "challenge the ingenuity of American industry" and went on to say: "But even though the achievement of these standards poses major engineering difficulties and will be costly and may, in the case of oxide of nitrogen emissions, require a technological breakthrough beyond the present state of the art, the need to protect the nation's health demands that effective control of automobile emissions must be placed high on our list of national environmental problems."

Among the proposals for removing the toxic and smog-forming constituents from automobile exhaust gases is that of U.S. Pat. 3,370,914 which discloses equilibrations of the constituents of exhaust gases, but this has not been adopted for general use; the catalysts exemplified are town gas catalysts and water-gas shift reaction catalysts and the conditions would convert nitrogen oxides largely to ammonia. A proposal in U.S. Pat. 3,493,325 to treat exhaust gases in a first stage in the absence of secondary air and in a second stage in the presence of secondary air; each stage employing a catalytic composite comprising a metal oxide in a subcrystalline state of dispersion in order to increase its degradation resistance, has also never reached commercial application. The proposals in U.S. Pat. 3,228,746 and U.S. Pat. 3,544,262, also relying on using a non-oxidising stage followed by an oxidising stage, have not apparently reached practical application.

We have found that nitrogen oxides can be removed without serious ammonia formation if the engine exhaust is subjected to the correct catalytic treatment, in particular, process conditions and catalysts appropriate for the high temperature steam-hydrocarbon reforming reaction as disclosed for the manufacture of carbon oxides and hydrogen. The catalytic steam-hydrocarbon reaction decreases the concentration of unburnt hydrocarbons— possibly but not essentially to within the prescribed limits—but, more importantly, transforms the nitrogen oxides largely to nitrogen and water. It appears that catalysts used in the process of the invention must act in the following ways:

(1) To cause reaction of hydrocarbons (represented as "$CH_2$") with steam and consequent production of carbon oxides and hydrogen $$CH_2 + H_2O \rightarrow CO + 2H_2;$$

(2) To cause reaction of hydrocarbons with carbon dioxide and consequent production of carbon oxides and hydrogen $$CH_2 + CO_2 \rightarrow 2CO + H_2;$$

(3) To cause the "shift" reaction of carbon monoxide with steam to give carbon dioxide and hydrogen $$CO + H_2O \rightarrow CO_2 + H_2$$

(4) To cause reaction of carbon monoxide with nitric oxide $$2CO + 2NO \rightarrow N_2 + 2CO_2$$

(5) To cause reaction of nitric oxide with hydrogen to give ammonia (the hydrogen is partly in the gas from the start, partly derived from reactions (1–3))

$$2NO + 5H_2 \rightarrow 2NH_3 + 2H_2O$$

(6) To cause decomposition of ammonia to nitrogen and hydrogen $$2NH_3 \rightarrow N_2 + 3H_2$$

Our invention is not limited to this particular reaction scheme, since other reactions may well take place to some extent. We believe however that we are the first to have recognised that these reactions can be effected to the required extent in conditions accessible in the treatment of automobile exhaust gases over a class of catalysts of high refractoriness but relatively low activity, preferably the high-temperature steam reforming catalysts.

According to the invention a process of treating an internal combustion engine exhaust gas in order to decrease its content of nitrogen oxides comprises passing the gas over a refractory catalyst under net reducing conditions at a temperature over 500° C., the conditions of temperature, catalytic activity and space velocity being chosen so as to destroy nitrogen oxides without substantial formation of ammonia.

The said conditions are chosen preferably so that at least 70% of the nitrogen oxides are destroyed, but at most 20% thereof is converted to ammonia. Still better degrees of removal are possible without excessive catalyst volumes or temperatures, for example over 90% removal with under 10% ammonia formation. After this treatment the gases are ready to be subjected to a second stage, involving shift, oxidation or methanation; combinations of such processes with the above-defined process constitute further features of the invention.

The temperature in steady running is preferably in a range suitable for cracking ammonia to nitrogen and hydrogen, suitably 600–950°, for example 750–900° C. and especially above 760° C.

In order to withstand these temperatures in an atmosphere which contains much steam, and also to withstand short periods at higher temperatures, the catalyst preferably has the composition of a high-temperature steam reforming catalyst, of the base-metal or precious metal type. Whereas, however, high temperature steam reforming catalysts are normally used as rings about 17 mm. in diameter, 10–20 mm. high and having a 7 mm. hole, the catalysts for the process of the invention are preferably in the form of particles having a length, breadth and height in the range 1–10 mm. and not differing by a factor of more than 2, or of honeycombs.

The properties that characterise a high temperature steam reforming catalyst of the base metal type are as follows:

(a) Active metal crystallite size: At least 1000 A. in catalyst as in use or after reduction by hydrogen diluted with steam at above 700° C. Such a catalyst has crystallites at least 100 A. in diameter when freshly reduced with dry hydrogen, but undergoes sintering if steam is present, as in the steam reforming process and in internal combustion exhaust gas. The active metal crystallite size when in use is typically 1000–15,000 A., for example about 2500 A. (Such crystallite sizes are measured by X-ray diffraction using copper K alpha radiation.)

(b) Active metal specific surface: This is less than about 10 m.$^2$/g. of the active metal and can be as low as about 0.01 m.$^2$/g., for example in the range 0.02 to 4.0 m.$^2$/g. By contrast, nickel-containing town gas catalysts have specific surfaces well above 10 m.$^2$/g. of nickel, for example 20 m.$^2$ per gram of catalyst containing about 50% of nickel, that is about 40 m.$^2$/gram of nickel. Other nickel catalysts, for example, vegetable oil hydrogenation catalysts, have still greater specific surfaces, for example 130 m.$^2$/g. These values are measured by adsorption of carbon monoxide or hydrogen.

(c) Comparatively low total specific surface: This should be less than 150 m.$^2$/g., suitably below 60 m.$^2$/g. The lower limit appears to be about 0.01 m.$^2$/g. These ranges apply whether the catalyst is of the compounded type or of the pre-formed support type.

(d) Hydrothermal stability: A steam reforming catalyst when in use is in or near a hydrothermal end-state. It may also be so when first brought into use, as the result of treatments with steam or water or both applied during preparation, but more usually such treatments are incomplete and the first hours, perhaps up to about a week, of use complete the transition. As a result of the transition, steam reforming catalysts are of low activity compared with catalysts intended for use in steam-free conditions or at relatively low temperatures. They are, however, stable, unlike catalysts of higher activity such as town gas catalysts. When the high temperature steam reforming catalyst is of the precious metal type it should likewise be in or near a hydrothermal end-state and have the stated low total specific surface. The proportion of precious metal required in such catalysts to afford catalytic activity of the same order as that of base metal catalysts is much less—for example under 0.3%. The active metal specific surface is greater than that of the base metals and the metal crystallites are smaller.

The gas leaving the high temperature steam reforming catalyst can then be treated further to remove carbon monoxide. It may be subjected to a shift conversion catalyst, the effect of which is to convert carbon monoxide to hydrogen, which is innocuous. If desired, the carbon monoxide can be converted to dioxide by air oxidation or can be converted to methane, but these steps produce a final gas which does not meet some exhaust gas specifications, and therefore are of more limited application. Nevertheless the use of the subsequent air-oxidation stage does meet the U.S. Environmental Pollution Agency 1975 and 1976 requirements as the Examples will show.

The temperature of the catalyst can, if the temperature of the exhaust gases is high enough, be maintained merely by avoiding heat losses, for example by mounting the catalyst vessel close to the engine or by insulating the reactor, the exhaust manifold or exhaust ducting or exhaust ports or more than one of these. Alternatively a supply of air can be effected, so that the inlet end of the catalyst is heated by combustion. Such an air supply can be made under warming-up conditions, that is, when both the engine and the catalyst are below working temperature, but thereafter cut off, possibly by a mechanism known for effecting automatic cold-start carbureter adjustment or an equivalent mechanism.

Thus this form of the invention may be defined as a process having a prior start-up phase and a running phase, the start-up phase being operated under oxidising conditions with added air in the presence of the refractory catalyst until the normal operating temperature of that catalyst has been reached, and the running phase being operated thereafter under net reducing conditions. If the net reducing stage over the refractory catalyst is followed by an oxidation stage, this form of the invention may be operated by having an air supply upstream of the refractory catalyst during the start-up phase and between the refractory catalyst and the oxidation catalyst during the running phase. The start-up phase may be extended until the catalyst of any subsequent stage has been heated to its operating temperature.

The quantity of air supplied in the said start-up phase need not be sufficient to afford over-all net oxidising conditions, provided there is sufficient to produce exothermic reaction. The air supply may usefully be preheated, especially for the start-up phase.

After the treatment over the refractory catalyst the gas is cooled (if necessary) to the inlet temperature of the next stage, suitably 400–600° C. for an oxidation or 350–500° for a "high-temperature" shift stage or 150–300°C. for a "low-temperature" shift stage or methanation stage. For an oxidation, inlet temperatures above 600° C. can be used, in which event little if any cooling is required. In steady running the air injected between the refractory catalyst and the oxidation stage should be at a rate sufficient to oxidise the carbon monoxide and hydrocarbons and afford a moderate excess for example up to 2% v./v. Suitably 2–3% v./v. of oxygen is added in steady running conditions, but appropriately more in cold-starting or in coasting, since more hydrocarbon and carbon monoxide are present.

The high temperature steam reforming catalyst preferably has nickel as its active metal.

Other metals known to have activity for the steam reforming reaction can, however, be used, particularly cobalt and the platinum group metals especially ruthenium. When the active metal is cobalt the process of the invention is especially suitable for treating the exhaust from an engine consuming a fuel containing sulphur compounds. We have discovered that, whereas nickel is poisoned by sulphur both for the hydrocarbon/steam reforming reaction and for reactions which remove nitrogen oxides, cobalt is poisoned less for the hydrocarbon/steam reaction and very much less for nitrogen oxides removal. Thus, when the sulphur content of the gasoline fuel fed to the engine is considerable, for example 200 to 1000 p.p.m. w./w. as sulphur, the active metal of the first stage catalyst preferably is cobalt. However since the quantity of cobalt catalyst required is greater the greater the sulphur content, this form of the invention is most economial and effective at lower sulphur contents, for example up to 250 p.p.m. w./w. as sulphur, such as can be supplied by gasoline manufacturers without an excessive price increase.

If a cobalt catalyst is used, it is very suitably of the type consisting essentially (over 70%) of cobalt oxide $Co_3O_4$, since in general cobalt is less catalytically active than nickel. Such high-cobalt catalysts can be on a refractory material, for example aluminous cement and alumina or a spinel as in a typical nickel steam reforming catalyst, or in sintered particles or units.

The catalyst particles can be loose in the reactor (care being taken to restrain movement of the particles and hence abrasion) or, in order better to resist vibration, can be fixed to a mechanical support such as a monolithic refractory or woven metal wire structure.

If the nitrogen oxides removal stage is followed by an oxidation, the oxidation catalyst is preferably a precious metal from Group VIII of the Periodic Table (according to Sidgwick, "The Chemical Elements and Their Compounds," Oxford, 1950); this is in particulate form or on a mechanical support such as a monolithic refractory or woven metal wire structure.

Conveniently the oxidation catalyst is a cobalt catalyst of the type which may be used for the high temperature first stage or a suitably promoted supported cobalt catalyst such as a copper-cobalt catalyst. Others which can be used include copper chromite and also platinum group metals, especially palladium, alone or together with one or more base-metal promoters such as copper or its oxides, preferably on a refractory support such as anhydrous alumina. The concentration of the platinum group metal is suitably in the range 0.002 to 1.0% calculated as metal.

A very suitable oxidation catalyst comprises the oxide of one or more base metals from Group VIII of the Periodic Table and an oxide of chromium or tungsten, preferably in intimate association. This catalyst contains the two oxides preferably in a proportion between half and double that which exists in the chromates or tungstates, conveniently in about equi-atomic proportions with respect to the metals.

The oxides are preferably brought together by co-precipitation, especially of the Group VIII metal cation with a chromate or tungstate, followed by heating to decompose the chromate or tungstate to a lower oxide. The catalyst may contain support materials such as alumina, silica or magnesia.

If the second stage is a shift process the shift catalyst can be of the high-temperature type, such as iron-chromia, zinc oxide-chromia or cobalt molybdate, or of the low temperature type containing copper along with zinc oxide and/or other oxides such as those of aluminium, magnesium, chromium or manganese. If a low temperature shift catalyst is used it may be protected from sulphur by a guard bed suitably of zinc oxide, iron oxide or cobalt oxide; and if halogen is likely to be present in the exhaust gases, a guard bed containing a material more basic than zinc oxide is preferably used. A catalyst comprising a combination or mixture of high-temperature and low-temperature shift catalysts is also very effective. Which shift stage is used will depend on the composition of outlet gas required and on the sulphur content of the gas, the high temperature type being favoured if the available fuel contains sulphur to the extent of more than 50 p.p.m. w/w.

The high temperature steam reforming catalyst, whichever catalytic metal it contains, preferably has a refractory support comprising one or more oxides such as magnesia, alumina, chromia, silica, titania, zirconia, urania and thoria. The catalyst can be of the compounded type (in which event its refractory support preferably contains from 15% to 60% of hydraulic cement), or of the pre-formed support type, the support being suitably alumina of specific surface under 60 m.$^2$/g. or a spinel. Whichever type of catalyst is used, it preferably contains less than 5% of silica for the most severe conditions likely to be encountered, in order to afford sufficient resistance to mechanical failure at the high temperature end of the bed. The nickel or cobalt content of the compounded-type catalyst is preferably in the range 15 to 40%. For a pre-formed support type catalyst the nickel or cobalt content is suitably in the range 5 to 20%. Both nickel and cobalt contents are calculated by weight as equivalent NiO on the oxide form of the catalyst; and it is within the invention to use a catalyst which before use is substantially in the oxide-form or in the metal form or is a mixture of the two. If the active metal is from the platinum group, its concentration is preferably in the range 0.002 to 1%, calculated as metal; a pre-formed support is normally used.

The catalysts can be in any of the usual forms, such as cylindrical extrusions or compressed pellets, rings, spheres or irregular lumps, or can be present as a solid body with gas passages through it (such as a "honeycomb") or as a coating on the inside or outside of a tube.

The space velocity of the gas exhaust gases passing over the steam reforming catalyst is suitably in the range 6000 to 60,000 hour$^{-1}$, that is, volumes of gas per unit volume of catalyst-filled space per hour. This is also a suitable range for the shift or oxidation catalyst, if one is used. It will be appreciated that in an internal combustion engine for a vehicle the space velocity is likely to range between lower and upper levels differing by a factor of up to about 10, but that for town conditions, in which atmospheric pollution is most serious, the range is considerably less, up to about 6.0 (that is, a space velocity range of 6000 to 36,000 hour$^{-1}$), since the speed of vehicle movement is usually limited by law and the rate of engine revolution is compensated by gear-changing. Nevertheless the volume of catalyst should be ample for the very high gas flows during accelerating-away in town traffic. It is also within the scope of the invention to use air-admission at times, such as starting or rapid acceleration, when the hydrocarbon content of the gas is unusually high. For this purpose a more refractory catalyst can be used at the inlet of the refractory catalyst bed than in its main portion. A catalyst resistant to carbon lay-down can be used, at least for the inlet of the bed, in order to provide for rapid acceleration conditions.

It will be appreciated that the catalyst or catalysts used in the process of the invention may exist at least partly in the reduced state and that then the exhaust gas treatment vessels should for best results be air-tight and should be closed to the admission of air as soon as the flow of exhaust gas has ceased. In particular this may be effected by a non-return valve, at the outlet of the exhaust system, and preferably distant from the catalyst, loaded for resiliently biassed to close the outlet. For greater safety in this respect a second such valve may be disposed just downstream of the catalyst bed which it is to protect.

The invention is applicable for example to the exhaust gases of reciprocating engines, rotary-piston engines and gas turbines and these engines may as fuel use, for example, town gas, natural gas, liquefied petroleum gas or liquid hydrocarbons such as gasoline, jet-fuel or diesel oil. Although, by maintaining temperatures in the higher part of the range for the reforming stage and by guarding or not using a copper-based low temperature shift catalyst, fuels containing sulphur or halogen impurities can be used, it is preferred to use a fuel containing less than 200 w./w. of sulphur and substantially no halogen. Likewise, in order to maximise the active life of the catalysts, it is preferred to use gasoline of low lead content, for examples less than 0.4 g. of Pb per U.S. gallon (3.8 litres), preferably under 0.01 g., that is substantially lead-free gasoline.

Since net reducing conditions are required for the stage over the refractory catalyst, it is preferable to operate the engines under rich-mixture conditions, such as produce an exhaust gas initially containing at least 1% of carbon monoxide. For a gasoline-fueled engine this means that the air to fuel weight ratio is preferably not above 15.0 and is, for example, in the range 13 to 15.

The invention provides also an apparatus for carrying out the process of the invention, which comprises an insulated first reactor adapted to be mounted close to an internal combustion engine and to be fed from the engine exhaust port or ports, a second reactor disposed downstream of the first reactor and air inlet means adapted to feed alternatively at or before the insulated reactor and between the reactors.

The alternation of the air feed may be in response to an automatic cold-start device, to catalyst temperature measurement or to a time-switch, the combinations of which means with the said apparatus are further features of the invention.

The apparatus may include a branch-conduit effective to pass a recycle stream of exhaust gas to the engine inlet. Such a branch-conduit ensures adequate nitrogen oxides removal capacity in the event of unusually high emissions or a design requirement for low-volume catalytic reactors.

The invention provides also an engine in combination with the apparatus, especially having internally insulated exhaust ports; and also a reactor, preferably in the form of a modified exhaust manifold, adapted for insertion into the apparatus and containing the high temperature steam reforming catalyst.

The invention appears, on a conservative estimate, to enable the U.S. emission standards of 1975 to be met using convenient catalyst volumes, for example 1.5 to 2.5 litres for so-called compact vehicles of 1750 to 2500 pounds equivalent inertia weight and 2 to 4 litres for vehicles of 3000 to 6000 pounds inertia weight. At the time of writing this specification the required performance has been maintained for 25,000 miles using a catalytic oxidation as the second stage. The process of the invention is capable of meeting more stringent specifications than those of 1975, for example those already prescribed for 1976. For this purpose somewhat larger catalyst volumes may be used, or (more conveniently) the process may be used in a system including recycle of exhaust gas; however, the extent of exhaust gas recycle need be only small, for example 4–12% by volume of the total exhaust flow, so that the loss of engine power is slight.

In the following examples the gas compositions are (unless otherwise stated) expressed in parts per million by volume or percentages by volume and the catalyst compositions are expressed in parts by weight. Where both exhaust gas compositions and mass emission values are quoted, these two parameters are related by the formulae set out in the U.S. Federal Register for June 4, 1968, pp. 8304 to 8324, and are as follows for light duty vehicles designed for transportation of persons or property on a street or highway and weighing 6000 pounds (2700 kg.) gross vehicle weight or less.

(i) for hydrocarbons:

HC mass = HC conc. $\times 10^{-6} \times 1.8 \times 6 \times$ exhaust volume per mile $\times$ density of hydocarbon.

(ii) for carbon monoxide:

CO mass = CO conc. $\times 10^{-2} \times$ exhaust volume per mile $\times$ density of CO.

(iii) (by analogy) for nitrogen oxides:

$NO_x$ mass = NO conc. $\times 10^{-6} \times$ exhaust volume per mile $\times$ density of $NO_2$.

The symbols have the following meanings:

HC mass = HC emissions in grams per vehicle mile.
HC conc. = HC concentration, in p.p.m. as hexane.
HC conc. $(1.8 \times 6)$ = HC conc. multiplied by 1.8 to correct for the lack of sensitivity in nondispersive infrared analyzers; and multiplied by 6 to convert from a molar baisis to a carbon atom basis.
Density$_{HC}$ = Density of hydrocarbons in the exhaust gas assuming an average carbon to hydrogen ratio of 1:1.85, in grams per cubic foot at 68° F. and 760 mm. of Hg (16.33 gm./cu. ft.).
CO mass = CO emissions in grams per vehicle mile.
CO conc. = CO concentration, in percent.
Density = Density of carbon monoxide in grams per cubic foot at 68° F. and 760 mm. Hg pressure (33.11 gm./cu. ft.).
Exhaust volume/mile = Exhaust volume in cubic feet per mile, as a function of dynamometer inertia wheel weight, calculated from the formula appropriate to type of transmission, as follows:

For automatic transmissions:

$$\text{Exhaust volume/mile} = (-6.69 + 0.0277W - 0.00000201W^2)$$

For manual transmissions:

$$\text{Exhaust volume/mile} = (-6.00 + 0.0249W - 0.00000181W^2)$$

where

W is the equivalent inertia weight, in pounds.
$NO_x$ mass = Oxides of nitrogen emissions, in grams per vehicle mile.
Density$_{NO2}$ = Density of oxides of nitrogen in the exhaust gas, assuming they are in the form of nitrogen dioxide, in grams per cubic foot at 68° F. and 760 mm. Hg pressure (54.10 gm./cu. ft.).
$NO_x$ conc. = Oxides of nitrogen concentration of the dilute exhaust sample minus the oxides of nitrogen concentration of the dilution air sample, in p.p.m.

The Federal Register sets forth calculation formulae for other classes of vehicle. The emission level standards and methods of measurement are up-dated in the U.S. Federal Register for Feb. 26, 1071, pp. 3824–3828 and July 2, 1971, pp. 12,653–12,661.

EXAMPLE 1

(a) A gas mixture containing nitrogen (about 65%) and the following constituents:

| | | |
|---|---|---|
| Steam | percent | 16.0 |
| $CO_2$ | do | 13.9 |
| CO | do | 1.4 |
| $C_4H_{10}$ | p.p.m | 760 |
| NO | p.p.m | 1338 |
| $H_2$ | percent | 2.4 |
| $O_2$ | do | 0.6 | and thus corresponding in composition to the exhaust gas of a piston internal combustion engine using gasoline as fuel was passed over two successive pelleted catalysts, the first a high-temperature steam reforming catalyst, the second a low-temperature shift catalyst, as described below. The volume hourly space velocity was 15,000 hour$^{-1}$ over each catalyst. Over the first catalyst the gas temperature was 799° C. After leaving this catalyst the gas was cooled to 251° C. and passed into the second catalyst. The outlet gas was found to have the composition (apart from nitrogen):

| | |
|---|---|
| Steam | 15.5%. |
| $CO_2$ | 14.4%. |
| CO | 0.8%. |
| $C_4H_{10}$ | 17 p.p.m. |
| NO and $NO_2$ | Undetectable. |
| $H_2$ | 2.3%. |
| $O_2$ | Under 0.1%. |
| $NH_3$ | 51 p.p.m. |

No nitrous oxide $N_2O$ or HCN could be detected in the outlet gas (limit of detection 10 p.p.m.).

It is evident that the gas has been transformed from a composition which infringes certain specified limits of exhaust gas composition (e.g. the limits for California in 1975):

| | |
|---|---|
| NO maximum | 408 p.p.m. (1.0 g./mile.). |
| CO maximum | 0.81% (12 g./mile). |
| Hydrocarbons maximum | 69 p.p.m. as hexane, i.e. 103 p.p.m. butane (0.5 g./mile). | to one which is almost acceptable, the excess carbon monoxide being readily removable by adjustment of shift conditions, i.e. by a larger quantity of the second catalyst. (The levels in g./mile refer to a vehicle of 2250 lbs. inertia weight.)

(b) In a second run, in which the first catalyst inlet temperature was 750° C. and the inlet gas contained less butane (230 p.p.m.) and more NO (1850 p.p.m.) the outlet gas had the composition (apart from nitrogen):

| | |
|---|---|
| Steam | 18.0% |
| $CO_2$ | 15.3%. |
| CO | 0.4%. |
| $C_4H_{10}$ | 8 p.p.m. |
| NO | 10 p.p.m. |
| $H_2$ | 1.1%. |
| $O_2$ | Under 0.1%. |
| $NH_3$ | 320 p.p.m. |

Again no nitrous oxide or HCN could be detected. Only the ammonia concentration was excessive, showing that insufficient reaction over the steam reforming catalyst had taken place.

(c) In a third run, in which the butane concentration was initially at the higher level of 928 p.p.m. and the NO concentration was 1620 p.p.m., the outlet gas had the composition:

| | |
|---|---|
| Steam | 17.5%. |
| $CO_2$ | 14.7%. |
| CO | 0.8%. |
| $C_4H_{10}$ | 30 p.p.m. |
| NO | Undetectable. |
| $H_2$ | 2.7%. |
| $O_2$ | Under 0.1%. |
| $NH_3$ | 41 p.p.m. |

This gas meets all the requirements of the 1975 California specification.

The catalysts used in these runs were as follows:

(i) The steam reforming catalyst consisted of 28% NiO compounded with alumina and aluminous cement and was in the form of 3.6 by 5.4 mm. squat cylindrical pellets. Its silica content was 0.9%. The specific surface of the nickel was 0.1 m.²/g. of catalyst measured after a reduction (for the purposes of the surface measurement) in a mixture of hydrogen (1 part) and steam (10 parts) at atmospheric pressure and at 850° C. for 100 hours. The nickel crystallites were 2,500 angstrom units in diameter after this reduction.

(ii) The shift catalyst consisted of 34% CuO, 54% ZnO and 12% $Al_2O_3$ brought together by a method involving co-precipitation of copper compounds and zinc compounds followed by dry-pelleting in 3.6 by 5.4 mm. squat cylindrical pellets. This also was used without prereduction or any pre-treatment other than heating-up.

(d) The following runs show the effect of the steam reforming catalyst on the composition of the gas mixture, which becomes suitable for the second stage of shift or oxidation. The nickel catalyst used was from a further batch of the catalyst used in runs (a) to (c).

TABLE I

| Temp., °C. | Space velocity hour$^{-1}$ | | $NO_x$, p.p.m. | $NH_3$, p.p.m. | $H_2$, percent | $O_2$, percent | CO, percent |
|---|---|---|---|---|---|---|---|
| 795 | 27,200 | Inlet | 1,425 | 0.0 | 0.68 | 0.22 | 2.00 |
| | | Outlet | 90 | 109 | 0.66 | 0.0 | 1.35 |
| 740 | 27,900 | Inlet | 1,198 | 0.0 | 0.74 | 0.24 | 2.05 |
| | | Outlet | 391 | 112 | 0.67 | 0.03 | 1.50 |

The percentage removal of $NO_x$ was 94% at 795° C. (8% as ammonia) but only 67% at 740° C. (9% as ammonia).

EXAMPLE 2

This example illustrates the principle that cobalt catalysts are less subject to sulphur poisoning than Ni catalysts. A gas simulating the exhaust from an internal combustion engine fueled with gasoline containing 200 p.p.m. w./w. of sulphur compounds (calculated as S) was passed at 800° C. over (a) a pelleted nickel-on-alumina/aluminous cement catalyst as described in Example 1 and (b) a sintered-pelleted cobalt oxide catalyst. The inlet composition of the gas was approximately

| | |
|---|---|
| $NO_x$ | About 2000 p.p.m. (mainly NO.) |
| Butane | About 2000–12,000 p.p.m. |
| $H_2$ | 2.5%. |
| $O_2$ | 1%. |
| $CO_2$ | 15%. |
| CO | 2%. |
| $H_2O$ | 15% as steam. |
| $N_2$ | Remainder. |
| S | 10–20 p.p.m. |

The volume hourly space velocity was 15,000 hour$^{-1}$.

The outlet gas was analysed for $NO_x$, hydrocarbons and ammonia, and the results are shown in Table 2. It is evident that the cobalt catalyst, although initially less active for hydrocarbon reforming, is more active after 1 day's operation than the nickel catalyst and still retains about two-thirds of its activity after 8 days, equivalent to about 5000 miles of continuous running. In nitrogen oxides removal the cobalt catalyst loses activity at much less than the rate at which the nickel catalyst loses activity. After 8 days' operation, the rate of ammonia formation over the cobalt catalyst is becoming significant, but substantially no nitrogen oxide is left unreacted.

The outlet gas from the cobalt-catalysed reactions is suitable in composition for further treatment over an oxidation catalyst, after suitably cooling and adding air.

TABLE 2

| Catalyst | S compound, p.p.m. w./w. as S | Time | NOx In, p.p.m. | NOx Out, p.p.m. | NOx Percent removed | 'NH3 P.p.m. out | 'NH3 Percent formed | HC In, p.p.m | HC Out, p.p.m. | HC Percent reformed |
|---|---|---|---|---|---|---|---|---|---|---|
| Ni-alumina-cement | 0.0 | 0 | 1,588 | 0 | 100 | 59 | 4 | 3,600 | 80 | 98 |
|  | EtSH 14 | 26 hours | 2,245 | 196 | 96 | 130 | 6 | 5,840 | 3,310 | 43 |
|  | SO2 20 | 27 hours | 1,940 | 239 | 88 | 142 | 8 | 6,700 | 3,910 | 42 |
| Cobalt oxide | SO2 20 | 0 days | 2,274 | 0 | 100 | 100 | 4.5 | 9,360 | 2,390 | 75 |
|  |  | 1 day | 1,837 | 10 | 100 | 66 | 3.5 | 7,050 | 3,888 | 55 |
|  |  | 4 days | 1,865 | 10 | 100 | 78 | 4 | 12,680 | 5,920 | 53 |
|  |  | 8 days | 2,000 | 10 | 100 | 273 | 14 | 10,400 | 5,280 | 49 |

EXAMPLE 3

A 4-cylinder British Leyland "Marina" engine of capacity 1796 cc. (112 cu. in.) and compression ratio 8.0 was equipped with a reactor adjacent to the cylinder head containing a catalyst bed (1) of capacity 2.0 litres. This was followed by a pipe containing an air injection nozzle and leading to an oxidation reactor containing a catalyst bed (2) of capacity 1.5 or 2.0 litres. The first reactor was lightly lagged externally, the second was internally lagged and the connecting pipe was unlagged. The engine was also fitted with air inlet pipes feeding into the spaces immediately outside the exhaust valves and with a recycle pipe leading from the outlet manifold to the fuel/air inlet pipe. The two air inlet pipes and the recycle pipe were each fitted with a flow control valve.

The engine was fueled with 91.7 Research Octane number (82.0 motor octane number) gasoline containing 2.2 mg. of lead (as Pb) per U.S. gallon and was tested using a dynamometer inertia weight to represent a vehicle of 2500 lb. For test purposes the carburetion was set to give between 2 and 2.5% carbon monoxide in the exhaust gas for most of the time. The sulphur content of the gasoline was 190 p.p.m. w./w.

Two test procedure were employed:
(1) The "Old" procedure as described in the U.S. Federal Register for Feb. 27, 1971. This was similar to the current procedure described in the next paragraph but excluded the second start.
(2) The current procedure is as described in the U.S. Federal Register, vol. 36, No. 128, July 2 (1971) involving a non-repetitive cycle and with the sampling procedure to give the appropriate combination of cold and hot operation. The sampling procedure was as follows: from a cold start the first 505 seconds exhaust was collected in gas bag A and the gas from the remainder of the cycle (total time 1369 secs.) into bag B. After 10 minutes' standstill the first 505 seconds of the cycle were repeated, the exhaust being collected in bag C. The emission level in g./vehicle mile was then calculated by way of the formula $(0.43A+B+0.57C)/7.5$. Analysis was by flame ionisation detector for hydrocarbons and by non-dispersive infra-red (NDIR) absorption for carbon monoxide. For NOx was used the NDIR or the Saltzmann method (colorimetric determination of the sulphanilic acid/naphthyl-ethylene diamine coupling product, as described in Analytical Chemistry, 26, No. 12, 1949–1955, Dec. 12, 1954). (Indications are that the newly adopted chemiluminescence method for NOx determination gives results significantly lower than those obtained with the NDIR or Saltzmann method.)

In some tests air ("upstream air") was added to the engine exhaust ports for the first 3 minutes from the cold start, in order to warm up the catalysts to the operating temperature of 850–950° C., then shut off and fed to the inlet to the oxidation catalyst. As a result the warming up of the oxidation catalyst was consideratbly quicker and its performance thereby enhanced. The rate of air addition at the inlet to the oxidation catalyst was in such excess that there was about 1% O2 in the exist gas during the highest loading of the catalyst. Runs were carried out with and without recycle of exhaust gases (ERG). Tables 3, 4 and 5 show the emission levels for cycles with and without EGR and upstream air, for two catalyst selections.

TABLE 3
Exhaust gas treatment using catalyst selection A (old procedure)

| | | g./mile | | |
|---|---|---|---|---|
| EGR | Upstream air | NOx | CO | HC |
| 5–10% | Yes | 0.22 | 2.5 | 0.41 |
| Proposed standards | | 0.4 | 4.7 | 0.46 |

TABLE 4
Exhaust gas treatment using catalyst selection A (current procedure)

| | | G./mile | | |
|---|---|---|---|---|
| E.G.R. | Upstream air | H/C | CO | NOx |
| 8% | Yes | 0.42 | 3.52 | 0.36 |
| Federal limits | | 0.41 | 3.4 | 0.4 |

Catalyst selection A (1) 2 litres of a highly refractory steam reforming catalyst consisting of sintered cobalt oxide having a specific surface of 0.4 m.²/g., a porosity of 0.28 v./v. and a density of 3.9 g./cc., in cylindrical pellets 3.2 by 3.2 mm.
(2) 0.04% palladium on alumina in 3.2 by 3.2 cylindrical pellets having a specific surface of 75 m.²/g.—1.5 litres Table 3, 2 litres Table 4.

TABLE 5
Exhaust gas treatment using catalyst selection B (current procedure)

| | | G./mile | | |
|---|---|---|---|---|
| E.G.R. (8–10%) | Upstream air | H/C | CO | NOx |
| Yes | Yes | 0.3 | 0.6 | 0.22 |
| Yes | No | 0.42 | 3.4 | 0.17 |
| No | Yes | 0.38 | 2.5 | 0.44 |
| Federal limits | | 0.41 | 3.4 | 0.4 |

Catalyst selection B (1) 2 litres of a highly refractory steam reforming catalyst containing nickel (32% as NiO) compounded with alumina and calcium aluminate cement and in the form of 5.4 mm. by 3.6 mm. squat cylindrical pellets. The surface area of the nickel was 0.1 m.² per gram of catalyst after reduction (for the purposes of surface measurement) in a mixture of hydrogen (1 part) and steam (10 parts) of atmospheric pressure and at 850° C. for 100 hours. The nickel crystallites were 2500 A. in diameter after this reduction.
(2) 2 litres of 0.04% palladium on alumina as in A.

This system was operated for 25,000 miles on a test bed and 4000 miles on the road without loss of performance or significant mechanical degradation of the catalyst.

EXAMPLE 4

A high-temperature steam reforming catalyst was used consisting of 0.11% w./w. of iridium on an alumina support in the form of 3.2 by 3.2 mm. cylindrical pellets and having a specific surface of 20 m.²/g. and a mean pore radius of 300 angstrom units. A gas mixture simulating auotmobile exhaust gas was passed over it at 800° C. at a total space velosity of 26,500 hour⁻¹. The gas consisted mainly of steam (15%), carbon dioxide (15%) and nitrogen, together with the minor constituents shown in the table.

TABLE 6

|  | $NO_x$, p.p.m. | $NH_3$, p.p.m. | $H_2$, percent | $O_2$, percent | $CO$, percent | HC, p.p.m. as $C_3$ |
|---|---|---|---|---|---|---|
| Inlet | 2,040 | 0.0 | 0.74 | 0.25 | 2.34 | 750 |
| Outlet | 109 | 745 | 0.95 | 0.0 | 1.74 | 538 |

The percentage $NO_x$ removal was 95%, only 37% of $NO_x$ being converted to ammonia. The outlet gas is suitable for oxidative treatment over for example a chromite or palladium/alumina or platinum/alumina catalyst to give an exhaust substantially free of nitrogen oxides, carbon monoxide and hydrocarbons. Even if all the ammonia were converted to $NO_x$ in such an oxidative treatment, the total $NO_x$ (854 p.p.m.) would be within the 1975 limit for a manual-transmission vehicle of 4000 lbs. inertia weight (859 p.p.m., 3.0 g./mile). If none of the ammonia were converted to $NO_x$, the total $NO_x$ would be within the 1976 limit for such a vehicle (114 p.p.m., 0.4 g./mile) and also for a manual transmission vehicle of 2250 lbs. inertia weight (181 p.p.m., 0.4 g./mile).

EXAMPLE 5

A catalyst similar to that of Example 4 but having as its active metal 0.35% of rhodium was operated at 805° C., space velosity 27,000 hour$^{-1}$, in the same gas mixture, with the results shown in Table 7.

TABLE 7

|  | $NO_x$, p.p.m. | $NH_3$, p.p.m. | $H_2$, percent | $O_2$, percent | $CO$, percent | HC, p.p.m. as $C_3$ |
|---|---|---|---|---|---|---|
| Inlet | 2,125 | 0.0 | 0.73 | 0.24 | 2.0 | 770 |
| Outlet | 115 | 354 | 0.4 | 0.0 | 1.54 | 754 |

The percentage $NO_x$ removal was 95%, only 17% of $NO_x$ being converted to ammonia. This outlet gas is suitable for an oxidative treatment to give an exhaust substantially free of nitrogen oxides, carbon monoxide and hydrocarbons.

EXAMPLE 6

A catalyst similar to that of Example 4 but having as its active metal 0.01% of ruthenium was operated at 805° C., space velocity 29,500 hour$^{-1}$, in the same gas mixture, with the results shown in Table 8.

TABLE 8

|  | $NO_x$, p.p.m. | $NH_3$, p.p.m. | $H_2$, percent | $O_2$, percent | $CO$, percent | HC, p.p.m. as $C_3$ |
|---|---|---|---|---|---|---|
| Inlet | 1,935 | 0.0 | 0.74 | 0.27 | 2.14 | 739 |
| Outlet | 52 | 116 | 0.3 | 0.0 | 1.64 | 741 |

The percentage $NO_x$ removal was 97%, only 6% of the $NO_x$ being converted to ammonia. The outlet gas is suitable for an oxidative treatment to give an exhaust substantially free of nitrogen oxides, carbon monoxide and hydrocarbons. Even if all the ammonia were converted to $NO_x$, the total $NO_x$ (168 p.p.m.) would be within the 1976 limit for a manual transmission vehicle of 2250 lbs. equivalent inertia weight.

EXAMPLE 7

Use of a supported cobalt catalyst

A quantity (4.2 kg.) of magnesia-alumina spinel having a crystallite-sheet structure was slurried with 20 litres of cobalt nitrate solution containing 1.42 kg. of cobalt metal and heated to 65° C. A solution of sodium carbonate (8 litres, 2.7 kg. of $Na_2CO_3$) was stirred in, whereafter the mixture was allowed to cool and filtered. The filter cake was washed, dried at 120° C. and calcined at 450° C. for 6 hours. The resulting oxide mixture was crushed and pelleted with graphite into 3.6 by 5.4 mm. squat cylindrical pellets having the following properties:

CoO _____ 26.5%.
Specific surface _____ 57 m.$^2$/g. (total).
Pellet density _____ 1.80 g./cc.
Pore volume _____ 0.269 cc./g.

A gas simulating exhaust gas was passed over it at 850° C., space velocity 18,000 hour$^{-1}$, with the following results.

TABLE 9

|  | $NO_x$, p.p.m. | $NH_3$, p.p.m. | $H_2$, percent | $O_2$, percent | $CO$, percent |
|---|---|---|---|---|---|
| Inlet | 2,836 | 0 | 2.5 | 0.8 | 2.1 |
| Outlet | 0 | 39 | 2.1 | 0 | 0.5 |

The outlet gas is suitable for oxidative treatment to give a gas substantially free of pollutants.

EXAMPLE 8

This example shows the effect of adding air and catalytically oxidising the gases formed by the treatment over a high-temperature steam reforming catalyst as in Examples 1(d), 2 and 4 to 7. A gas mixture simulating such treated gases and having the following composition was used.

|  | Percent |
|---|---|
| $CH_4$ | 0.4 |
| $H_2$ | 0.7 |
| $CO$ | 2.5 |
| $O_2$ | 3.8 |
| $CO_2$ | 14.0 |
| Steam | 15.0 |
| $N_2$ | Remainder |

(Methane was used as the hydrocarbon since it is less easily oxidised than higher hydrocarbons.)

The following catalysts were used:
(A) 0.2% platinum on alumina on a ceramic honeycomb.
(B) 0.08% platinum on ⅛ inch cylindrical pellets of alumina of surface area 75 m.$^2$/g.
(C) 0.03% palladium on the same support as catalyst (B).

The following results were obtained on passing the gases over the catalyst at 700° C. at a space velocity of 40,000 hour$^{-1}$.

TABLE 10

| Catalyst: | Percentage removal | | Remaining concentration, percent | |
|---|---|---|---|---|
|  | CO | $CH_4$ | CO | $CH_4$ |
| 1 | 99.4 | 72 | 0.015 | 0.0024 |
| 2 | 99.1 | 66 | 0.022 | 0.0036 |
| 3 | 91.2 | 25 | 0.22 | 0.036 |

EXAMPLE 9

This is a further example of an oxidation stage: the catalyst used was reduced nickel chromite of nominal composition NiO 46–52%; $Cr_2O_3$ 47–53%; loss at 900° C. 10%, which had been made by reacting nickel nitrate with chromic acid in the presence of ammonia, washing, drying and calcining the precipitate, and pelleting the resulting oxides.

The gas passed over it corresponded in composition to an extreme case of an exhaust gas which had been treated inefficiently to remove nitrogen oxides, and to which 12% v./v. of air had been added. The reaction which took place was exothermic over-all, the inlet temperature being 480° C. and the outlet temperature above 600° C. The volume hourly space velocity was 15,000. Table 11 shows the compositions of the gas before and after the reaction (the remanider is made up of chiefly $N_2$, $CO_2$ and about 15% w./v. water vapour), and the percentage conversions:

TABLE 11

| | P.p.m. v./v. | | | Percent v./v. | | | | Percent conversion | | |
|---|---|---|---|---|---|---|---|---|---|---|
| | $NO_x$ | $NH_3$ | $C_4H_{10}$ | CO | $CO_2$ | $H_2$ | $O_2$ | HC | CO | $NH_3$ to NO |
| Inlet | 0 | 2,520 | 340 | 1.1 | 16.5 | 3.4 | 2.3 | }91.5 | 92 | 6.7 |
| Outlet | 75 | 49 | 102 | 0.1 | 18.4 | 0.2 | 0.09 | | | |

The outlet gas is within the 1975 California specification as set forth in Example 1. It is evident that using this catalyst, a substantial margin of safety is present in oxidising gases containing more than the desired content of ammonia.

EXAMPLE 10

Effect of carbon monoxide concentration on nitrogen oxides removal

The catalyst selections A and B of Example 3 were used in reactors in the exhaust line of a 1600 cc. Ford "Cortina" engine operated without EGR under steady state conditions (50 m.p.h., equivalent inertia weight 2250 lbs., gas space velocity 26,000 hour$^{-1}$) at four different carbon monoxide concentrations arrived at by varying the air-fuel ratio in the range 14.9 to 13.2 by weight. The temperature of the nickel or cobalt catalyst was 750° C., of the palladium catalyst 650° C. The percentage conversions of $NO_x$ shown in Table 12 were derived from Saltzmann analyses.

TABLE 12

| Catalysts | CO, percent | $NO_x$, p.p.m. Inlet | $NO_x$, p.p.m. Outlet | $NO_x$ conversion, percent |
|---|---|---|---|---|
| A | 1 | 1,990 | 380 | 81 |
| | 2 | 1,570 | 260 | 83 |
| | 3 | 1,120 | 160 | 86 |
| | 4 | 790 | 100 | 87 |
| B | 1 | 2,212 | 500 | 78 |
| | 2 | 2,025 | 375 | 81 |
| | 3 | 1,675 | 250 | 85 |
| | 4 | 1,400 | 200 | 86 |

It is evident that at the lowest CO concentration the outlet $NO_x$ concentration would be adjustable by higher temperature and/or EGR into an acceptable range.

What is claimed is:

1. A process of treating an internal combustion engine exhaust gas containing nitrogen oxides and carbon monoxide to decrease the content thereof before discharge into the atmosphere, said process comprising a start-up phase wherein the exhaust gas and added air are passed over a refractory catalyst under oxidizing conditions to heat said catalyst to its operating temperature in the range of 750–900° C., a subsequent running stage wherein the exhaust gas is passed over the refractory catalyst under net reducing conditions at said operating temperature and at a space velocity of 6000 to 60,000 hour$^{-1}$ whereby at least 70% of the nitrogen oxides in said exhaust gas is destroyed with not more than 20% thereof being converted to ammonia, and a further stage wherein the thus treated exhaust gas is passed over an oxidation catalyst to convert the carbon monoxide in said gas to a nontoxic or innocuous gas, said refractory catalyst consisting essentially of a high temperature steam reforming base metal or precious metal catalyst having an active metal crystallite size of at least 1000 Å., an active metal specific surface of less than about 10 m.$^2$/g. of the active metal, a total specific surface of less than 150 m.$^2$/g. and hydrothermal stability, the catalyst being supported on a steam-stable refractory oxide.

2. The process of claim 1 wherein said refractory catalyst includes nickel or cobalt as the active metal and the exhaust gas, after passing over the refractory catalyst to destroy nitrogen oxides, is passed over an oxidation catalyst which includes a metal from Group VIII of the Periodic Table.

3. The process of claim 2 wherein the exhaust gas initially contains at least 1% carbon monoxide and is obtained from a gasoline fueled engine wherein the air to gasoline ratio is not above 15.

4. A process for treating an internal combustion engine exhaust gas, said process having a start-up phase and a running phase, the running phase comprising passing the gas over a refractory catalyst under net reducing conditions at a temperature over 500° C., the conditions of temperature, catalytic activity and space velocity being chosen so as to destroy nitrogen oxides without substantial formation of ammonia, said refractory catalyst being a high-temperature steam-reforming catalyst supported on a steam-stable refractory oxide, and the start-up phase being operated prior to the running phase under oxidising conditions with added air in the presence of the refractory catalyst until the normal operating temperature of that catalyst has been reached.

References Cited
UNITED STATES PATENTS

| 1,902,160 | 3/1933 | Frazer et al. | 423—213 |
| 2,991,160 | 7/1961 | Claussen | 60—284 |
| 3,224,188 | 12/1965 | Barlow | 60—278 |
| 3,370,914 | 2/1968 | Gross et al. | 423—213 |
| 3,454,355 | 7/1969 | Ryason | 423—239 |
| 3,544,264 | 12/1970 | Hardison | 423—214 |
| 3,565,574 | 2/1971 | Kearby et al. | 423—213 |
| 3,316,057 | 4/1967 | Howk et al. | 423—213 |
| 3,423,194 | 1/1969 | Kearby | 60—301 |
| 3,444,099 | 5/1969 | Taylor et al. | 423—213 X |
| 3,524,721 | 8/1970 | Stephens | 423—213 |
| 3,662,540 | 5/1972 | Murphey | 423—213 X |

GEORGE O. PETERS, Primary Examiner